United States Patent [19]
Vitous

[11] B 3,924,525
[45] Dec. 9, 1975

[54] BEVERAGE CHAMBER FILTER

[75] Inventor: Charles J. Vitous, Berwyn, Ill.

[73] Assignee: Cory Food Services, Inc., Chicago, Ill.

[22] Filed: May 10, 1973

[21] Appl. No.: 359,187

[44] Published under the Trial Voluntary Protest Program on January 28, 1975 as document no. B 359,187.

[52] U.S. Cl. .................................. 99/303; 99/295
[51] Int. Cl.² .......................................... A47J 31/00
[58] Field of Search ...... 99/295, 303, 307, 296–297, 99/298–299, 300–301, 302, 304–305, 306; 220/40

[56] References Cited
UNITED STATES PATENTS

| | | | |
|---|---|---|---|
| 2,558,521 | 6/1951 | Karlen | 99/303 |
| 2,618,218 | 11/1952 | Peters | 99/303 |
| 3,793,935 | 2/1974 | Martin | 99/295 |

*Primary Examiner*—Robert L. Bleutge
*Assistant Examiner*—Arthur O. Henderson
*Attorney, Agent, or Firm*—Hofgren, Wegner, Allen, Stellman & McCord

[57] ABSTRACT

Apparatus for brewing a beverage such as coffee wherein means for preventing transfer of the beverage forming ingredients, such as coffee grounds, from the brewing chamber during delivery of the brewed beverage from the chamber are provided. The filter means herein comprises a wall element extending across an outlet opening from the brewing chamber and cooperatively defining with the chamber means a plurality of small flow passages for passing the brewed beverage while effectively impeding passage of particulate brewing material.

20 Claims, 5 Drawing Figures

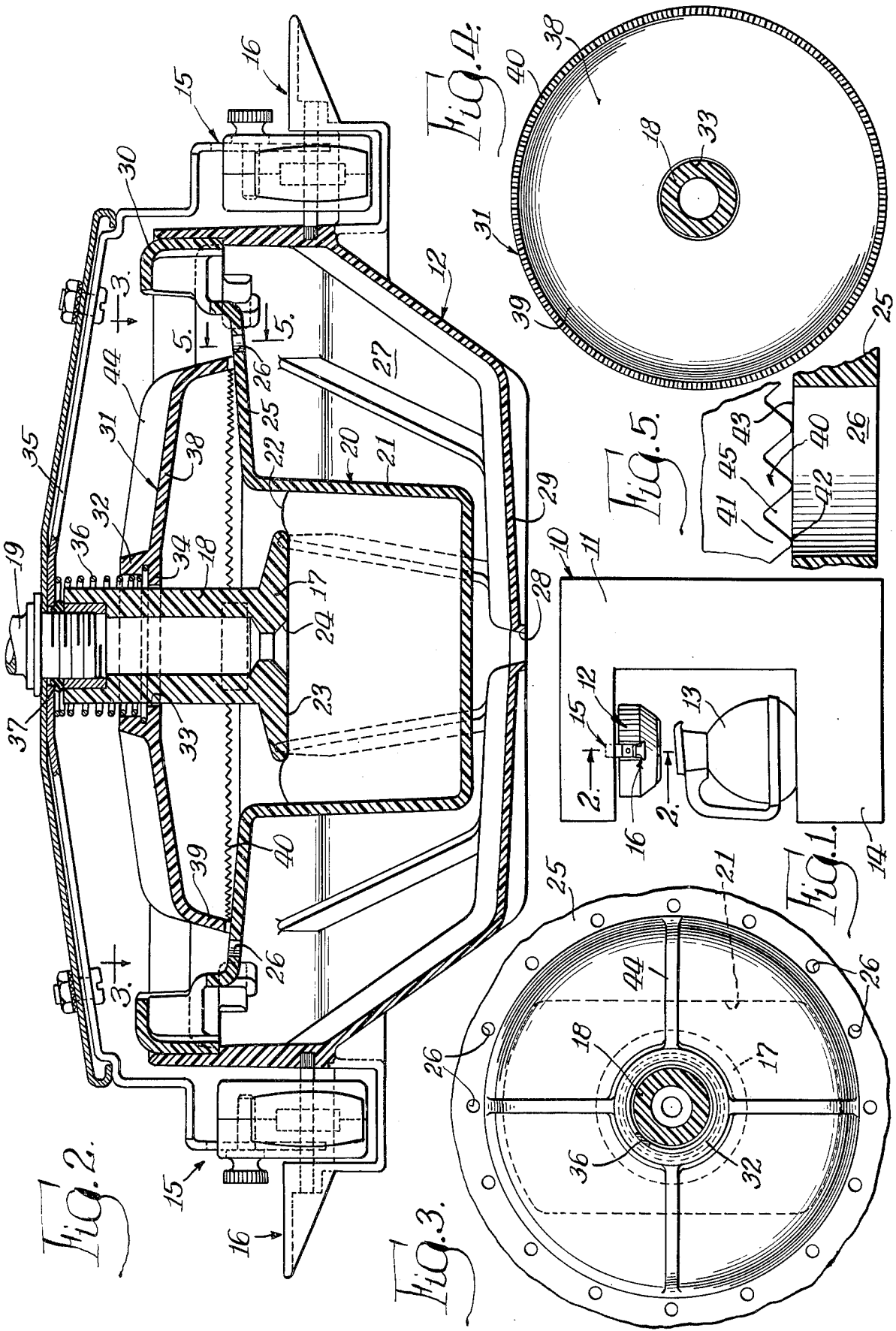

BEVERAGE CHAMBER FILTER

BACKGROUND OF THE INVENTION

1. Field of the Invention

This invention relates to brewing apparatuses, and in particular, to means for filtering brewed beverage during the delivery thereof from a brewing chamber.

2. Description of the Prior Art

In U.S. Pat. No. 2,554,367 of Harvey R. Karlen, owned by the assignee hereof, a beverage brewer is shown wherein a brewing cartridge defines a brewing chamber wherein coffee is brewed by subjection of coffee grounds therein to suitable heated water delivered to the brewing chamber through a delivery tube. The brewed coffee is delivered from the brewing chamber from an outlet spout. A filter is provided across the top of the cartridge in the form of a strainer of fabric or like material.

More recently, an improved form of such a beverage brewing apparatus as disclosed in Edwin J. Alexander, Jr. et al. U.S. Pat. No. 3,502,017, such a brewing means may be adapted further for use with a bagged charge of beverage forming ingredient such as coffee. The filter means is utilized in such a structure to prevent passage of coffee grounds and the like with the delivered brewed coffee such as where the bag of the bagged charge is inadvertently ruptured.

SUMMARY OF THE INVENTION

The present invention comprehends such a beverage brewing apparatus wherein an improved filter means is provided.

More specifically, the present invention comprehends the provision in a brewer for brewing a beverage from a charge of particulate brewing ingredients, means defining a brewing chamber for holding the brewing ingredient charge, and having an outlet opening for delivering brewed beverage from the chamber, and means for introducing brewing liquid to the chamber for acting on a charge therein to form brewed beverage therein, of means for controlling flow of the brewed beverage outwardly through the outlet opening comprising an impermeable wall element extending across the outlet opening and having a peripheral edge portion engaging the brewing chamber means about the outlet opening and defining therewith a plurality of small flow passages for passing the brewed beverage outwardly therethrough while effectively impeding passage of particulate charge material therethrough.

The wall element may comprise a concave element with a downturned edge portion defining the peripheral edge portion. The peripheral edge portion may be serrated. The wall element may be biased to effect yieldable engagement of the teeth with the brewing chamber.

The means for introducing the brewing liquid into the brewing chamber may extend through the wall element and the biasing means may comprise a coil spring extending coaxially about the introducing means. The biasing spring may have a preselected strength such as for applying a two-pound force to the wall element thereby to define a pressure relief means in the filter.

The wall element may be formed of molded plastic and may be provided with reinforcing ribs.

The outlet opening may comprise the upper end of the brewing chamber with the wall threreat extending laterally outwardly to be engaged by the wall element.

The flow control means is adapted for use with such a brewer utilizing a bagged charge of coffee such that if the bag should inadvertently be torn, the loose grounds will be prevented from flowing outwardly with the brewed coffee through the outlet. It has been found that in the commercial use of such bagged coffee charges, such tears or ruptures of the bag occur from time to time requiring the use of suitable filtering means to prevent flow thereof with the delivered coffee. Normally, however, only brewed coffee is delivered from the brewing chamber as the bag serves as a retaining filter means within the brewing chamber itself. Thus, the present filter effectively defines a safety device accommodating abnormal conditions in the brewer.

Thus, the flow control means of the present invention is extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a side elevation of a brewer having a flow control means embodying the invention;

FIG. 2 is an enlarged vertical section taken substantially along the line 2—2 of FIG. 1;

FIG. 3 is a fragmentary horizontal section taken substantially along the line 3—3 of FIG. 2;

FIG. 4 is a bottom plan view of the flow control means; and

FIG. 5 is a fragmentary enlarged vertical section taken substantially along the line 5—5 of FIG. 2.

DESCRIPTION OF THE PREFERRED EMBODIMENT

In the exemplary embodiment of the invention as disclosed in the drawing, a brewing apparatus generally designated 10 illustratively comprises a coffee brewer having a hot water supply means 11 adapted to provide a suitable quantity of hot water to a brewing cartridge 12 for brewing a preselected quantity of coffee therein and arranged to deliver the brewed coffee to a subjacent decanter 13 carried on a base portion 14.

Cartridge 12 is removably retained in the apparatus by means of a pair of mounting devices 15 cooperating with a handle 16 on the cartridge to dispose the cartridge subjacent the delivery portion 17 of a hot water supply tube connected to a suitable conduit 19 for receiving hot water from the supply 11.

Cartridge 12 includes an insert portion 20 defining a well 21 adapted to receive a bagged charge of coffee 22. When cartridge 12 is installed on the brewer, as shown in FIG. 2, bagged coffee charge 22 is engaged by the lower surface 23 of delivery portion 17 of the hot water supply so as to provide direct communication between the outlet opening 24 at the lower end of tube 18 and the bagged charge. Hot water delivered through conduit 18 is thusly directed into the bagged charge for effecting the brewing of the coffee therein with the resulting brewed coffee flowing upwardly from well 21 and laterally outwardly over an outturned annualar upper wall portion 25 of the insert 20 to a plurality of discharge openings 26 which conduct the brewed coffee downwardly into the subjacent outlet chamber 27 of cartridge 12. The brewed coffee then passes from outlet chamber 27 through a discharge opening 28 in the bottom wall 29 of the cartridge into the subjacent decanter 13.

Cartridge 12 further includes wall means 30 for removably retaining insert 20 in the cartridge while permitting disassembly thereof when desired such as for maintenance purposes. As shown in FIG. 2, in the installed arrangement of the cartridge, the delivery tube portion 17 extends downwardly to within well 21.

As indicated briefly above, the present invention comprehends the provision of an improved means for controlling the flow of the brewed coffee from well 21 to the outlet openings 26 adapted to prevent flow of coffee grounds outwardly thereto in the event of a rupture of the bagged charge 22. More specifically, the flow control means herein comprises a wall element 31 having a central portion 32 defining an opening 33 downwardly through which hot water delivery tube 18 extends. Opening 33 is defined by an annular shoulder 34. Mounting devices 15 are provided on the opposite ends of a bracket 35 and a coil spring 36 is compressed between bracket 35 and shoulder 34 to bias wall element 31 downwardly. The upper end of delivery tube 18 may be sealed to the hot water supply line 19 by suitable means such as O-ring 37 adjacent the upper end of the coil spring 36.

Wall element 31 includes an impermeable annular portion 38 extending outwardly from central portion 32 and defining a downturned peripheral portion 39 terminating in a serrated lower edge 40. As shown in FIG. 5, serrated edge 40 is defined by a plurality of teeth 41 having tips 42 engaging the upper surface 43 of the wall portion 25 being yieldably urged thereagainst by the biasing action of spring 36. In the illustrated embodiment, teeth 41 have a height approximately one-half the tip-to-tip spacing therebetween, and illustratively, may have a height of approximately 0.032 inch with a tip-to-tip spacing of approximately 0.062 inch. The wall element may be formed of any suitable readily maintainable material, and in the illustrated embodiment, is formed of polysulfone synthetic plastic. Coil spring 36 may be formed of any suitable spring material, and in the illustrated embodiment, is formed of Type 302 stainless steel spring wire to develop a force of approximately 2 to 2½ pounds in urging the teeth 41 against wall 25. The wall element may be provided with suitable reinforcing ribs 44.

Thus, in use, the user places a fresh bagged charge of coffee 22 in cartridge well 21 with the cartridge removed from brewer 10. The cartridge is then installed on mounting devices 15 to bring the bagged charge upwardly against the lower surface 23 of the hot water delivery tube portion 17. In bringing the cartridge to this disposition, wall portion 25 of the insert 20 is urged upwardly against the serrated edge 40 of the filter wall element 31 so that serrated edge 40 cooperates with wall 25 to define a plurality of small flow passages 45 for passing the brewed coffee outwardly to the openings 26 for delivery through the collecting chamber 27 and outlet opening 28 to decanter 13. To effect the brewing of the coffee, the user operates the brewing apparatus to deliver a preselected quantity of hot water from supply line 19 into the bagged charge 22.

The coffee grounds are normally retained within the bagged charge and only coffee liquid is directed upwardly from well 21 outwardly past the serrated edge 40 of the filter wall element to the decanter 13 as discussed above. However, should the filter bag, for any reason, be ruptured, such as by being torn during the installation thereof in the brewer, coffee grounds which may flow upwardly therefrom during the brewing operation are prevented from passing outwardly through the openings 26 by the cooperating serrated edge 40 and wall 25.

In the event that a rupture of the bag occurs which effectively frees substantially all of the coffee grounds, the filter means defined by the serrated edge 40 and confronting wall 25 may become fully blocked by the grounds. In this event, the pressure of the incoming hot water may be sufficient to overcome the biasing force of spring 36, permitting a release of the pressure whereby the filter 31 serves as a safety device in preventing the application of excessive pressures to the brewing means.

The foregoing disclosure of specific embodiments is illustrative of the broad inventive concepts comprehended by the invention.

I claim:

1. In a brewer for brewing a beverage from a charge of particulate brewing ingredients, means defining a brewing chamber for holding the brewing ingredient charge and having an outlet opening for delivering brewed beverage from the chamber, and means for introducing brewing liquid to said chamber for acting on a charge therein, means for controlling flow of the brewed beverage outwardly through said outlet opening comprising an impermeable wall element extending across said outlet opening and having a peripheral edge portion engaging said brewing chamber means about said outlet opening and defining therewith a plurality of small flow passages having a size preselected for passing the brewed beverage outwardly therethrough while effectively preventing passage of particulate charge material therethrough.

2. The brewer flow control means of claim 1 wherein said introducing means extends through said wall element.

3. The brewer flow control means of claim 1 wherein said wall element comprises a concave element opening toward said brewing chamber.

4. The brewer flow control means of claim 1 wherein said wall element defines a circumferential turned flange having a distal portion defining said peripheral edge portion.

5. The brewer flow control means of claim 1 wherein said peripheral edge portion is serrated.

6. The brewer flow control means of claim 1 wherein said peripheral edge portion is serrated having teeth having height approximately one-half the tip-to-tip spacing therebetween.

7. The brewer control means of claim 1 wherein said brewing chamber includes an outturned, annular upper wall and said wall element peripheral portion comprises an annular portion engaging said brewing chamber upper wall.

8. In a brewer for brewing a beverage from a charge of particulate brewing ingredients, means defining a brewing chamber for holding the brewing ingredient charge and having an outlet opening for delivering brewed beverage from the chamber, and means for introducing brewing liquid to said chamber for acting on a charge therein, means for controlling flow of the brewed beverage outwardly through said outlet opening comprising:

an impermeable wall element extending across said outlet opening and having a peripheral edge portion engaging said brewing chamber means about said outlet opening and defining therwith a plurality of small flow passages having a size preselected for passing the brewed beverage outwardly therethrough while effectively preventing passage of particulate charge material therethrough; and means biasing said wall element to yieldingly urge said edge portion against said brewing chamber means.

9. The brewer flow control means of claim 8 wherein said biasing means comprises a coil spring disposed concentrically about said means for introducing brewing liquid to said chamber.

10. The brewer flow control means of claim 8 wherein said biasing means is preselected to apply approximately a 2-pound force to said wall element.

11. The brewer flow control means of claim 8 wherein said edge portion is serrated, with the teeth thereof engaging said brewing chamber means.

12. The brewer flow control means of claim 8 wherein said edge portion defines an annular portion and said biasing means is arranged to act parallel to and adjacent the axis of said annular portion.

13. The brewer flow control means of claim 8 wherein said wall element is formed of molded plastic.

14. The brewer flow control means of claim 8 wherein said wall element is provided with means for reinforcing the wall element in the direction of biasing.

15. The brewer flow control means of claim 8 wherein said outlet opening is at the top of the brewing chamber.

16. the brewer flow control means of claim 8 wherein said outlet opening extends fully across the top of the chamber.

17. In a brewer for brewing a beverage from a charge of particulate brewing ingredients, means defining a brewing chamber for holding the brewing ingredient charge and having an outlet opening for delivering brewed beverage from the chamber, and means for introducing brewing liquid to said chamber for acting on a charge therein, means for controlling flow of the brewed beverage outwardly through said outlet opening comprising a wall element extending across said outlet opening and having an impermeable mid-portion and a peripheral edge portion engaging said brewing chamber means about said outlet opening and defining a plurality of small flow passages having a size preselected for passing the brewed beverage outwardly therethrough while effectively preventing passage of particulate charge material therethrough.

18. The brewer flow control means of claim 17 wherein said peripheral edge portion comprises a downturned flange circumscribing said mid-portion.

19. The brewer flow control means of claim 17 wherein said flow passages are arranged in a single continuous row.

20. The brewer flow control means of claim 17 wherein said flow passages open generally horizontally.

* * * * *